(12) United States Patent
Yang

(10) Patent No.: US 7,701,868 B2
(45) Date of Patent: Apr. 20, 2010

(54) METHOD AND NETWORK APPARATUS FOR CARRYING MULTIPLE SERVICES

(75) Inventor: Jishang Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 334 days.

(21) Appl. No.: 11/779,592

(22) Filed: Jul. 18, 2007

(65) Prior Publication Data

US 2008/0212589 A1  Sep. 4, 2008

(30) Foreign Application Priority Data

Jul. 19, 2006  (CN)  .......................... 2006 1 0099397

(51) Int. Cl.
H04J 1/16 (2006.01)
H04J 3/16 (2006.01)
(52) U.S. Cl. ........................................ 370/252; 370/465
(58) Field of Classification Search .................. 370/252, 370/465
See application file for complete search history.

(56) References Cited

U.S. PATENT DOCUMENTS

| 6,396,837 | B1* | 5/2002 | Wang et al. ............. | 370/395.21 |
| 6,633,628 | B1* | 10/2003 | Linder et al. ............. | 379/22.07 |
| 6,775,268 | B1* | 8/2004 | Wang et al. .................. | 370/352 |
| 7,228,358 | B1* | 6/2007 | McManus .................... | 709/239 |
| 2003/0043785 | A1* | 3/2003 | Liu et al. ..................... | 370/352 |
| 2004/0192391 | A1* | 9/2004 | Nagai ........................... | 455/561 |
| 2005/0226251 | A1* | 10/2005 | Krzanowski et al. ... | 370/395.41 |
| 2007/0127489 | A1* | 6/2007 | Amaya et al. ............ | 370/395.2 |
| 2007/0206600 | A1* | 9/2007 | Klimker et al. ............. | 370/394 |
| 2008/0018427 | A1* | 1/2008 | Ezra et al. ................... | 340/7.32 |

FOREIGN PATENT DOCUMENTS

CN  1708020 A  12/2005

OTHER PUBLICATIONS

Telecommunication Standardization Sector of International Telecommunication Union, "Asymmetric digital subscriber line (ADSL) transceivers," ITU-T Recommendation G.992.1 (Jun. 1999).
Telecommunication Standardization Sector of International Telecommunication Union, "Asymmetric digital subscriber line transceivers 2 (ADSL2)," ITU-T Recommendation G.992.3 (Jan. 2005).
Telecommunication Standardization Sector of International Telecommunication Union, "Asymmetric digital subscriber line transceivers—extended bandwidth ADSL2 (ADSL2+)," ITU-T Recommendation G.992.5 (Jan. 2005).

* cited by examiner

Primary Examiner—Andrew Lee
(74) Attorney, Agent, or Firm—Leydig, Voit & Mayer, Ltd.

(57) ABSTRACT

A method for carrying multiple services includes: transmitting services to bearer channels at a physical port of an XDSL chipset according to different requirements of the services on service latency; and mapping the services on the bearer channels into different latency paths according to preset relations between the bearer channels and the latency paths. Network apparatus for carrying multiple services are also provided. The embodiments of the present invention enable different services to be transmitted on different latency paths, by which the requirements of different services on both transmission latency and transmission quality are fulfilled. The embodiments of the present invention also remedy the defect in ADSL and VDSL technologies that XDSL chipset does not support multiple latency paths, which improves the application of XDSL technology and further improves user satisfaction.

19 Claims, 3 Drawing Sheets

METHOD AND NETWORK APPARATUS FOR CARRYING MULTIPLE SERVICES

This application claims priority to Chinese Patent Application No. 200610099397.X, filed Jul. 19, 2006, which is hereby incorporated by reference.

FIELD OF THE TECHNOLOGY

The present invention relates to network communication technologies, and particularly, to a method and network apparatus for carrying multiple services.

BACKGROUND OF THE INVENTION

In the late 1990s, new services including online surfing, video multicast, Video on Demand (VoD), Voice over Internet Protocol (VoIP), etc, emerged one after another along with the rapid development of Internet, and the new services have imposed higher requirements on network bandwidth. Varieties of access network technologies have been developed to satisfy the demand of users for bandwidth, e.g., Integrated Services Digital Network (ISDN), coaxial cable modem, Asymmetrical Digital Subscriber Loop (ADSL), Very High Speed Digital Subscriber Loop (VDSL), etc.

Among the emerging new access network technologies, ADSL provides a high-speed data transmission on twisted pairs based on the existing narrow band telephony network, which is favorable for conventional operator to support new services with a low cost and a high efficiency, hence the ADSL technology is very promising. Though ADSL technology appeared more than 10 years ago, it is still the mainstream broadband access technology and will probably remain popular for another couple of years.

Being challenged by other new technologies, ADSL technology does not stop evolving but keeps on developing and perfecting the technology itself. The authority that issues the ADSL standards, since the issuance of the first ADSL standard G.992.1 in 1999, has issued ADSL2 standard G.992.3 and ADSL2+ standards G.992.5. The development of ADSL technology is directly reflected most in the ever increasing transmission bandwidth: at first the download transmission rate supported by ADSL technology was 6144 k and the upload transmission rate was 896 k, now ADSL2+ supports an upload transmission rate of millions of bits and a download transmission rate of tens of million bits.

Another mainstream broadband access technology other than ADSL technology is VDSL technology. VDSL technology also provides broadband services based on twisted pairs of narrowband telephony network. The frequency spectrum of VDSL technology is wider. Therefore the data transmission rate provided by VDSL technology can be as high as 200 Mb. However, while providing services, VDSL technology requires a shorter distance between a central office and end users and consequently certain modifications of the existing networks. Therefore VDSL technology has not been applied in large scale. Greater development is expected in a few years.

A conventional method for carrying multiple services at an XDSL physical port of a single latency path achieves multiple services recognition only, i.e., on either single Virtual Channel (VC) or multiple VCs, the services are transmitted on the same latency path, thus the transmission latency and quality of different services are also the same, which makes it impossible to fulfill different requirements of different services on transmission latency and transmission quality, e.g., VoIP service requires short latency and tolerates low transmission quality to some extent while video multicast or VoD service is very sensitive to frame loss in the transmission. When the transmission latency at the XDSL port is short, the requirements of voice services on time latency will be satisfied while the requirements of video services on frame loss rate can not be satisfied. When the transmission latency at the XDSL port is long, the requirements of video services on frame loss rate will be satisfied while the requirements of voice services on time latency can not be satisfied. As a consequence, when the XDSL port supports a single latency path, the requirements of varieties of services are all taken into consideration while setting the maximum transmission latency at the XDSL port, which results in a poor quality in general for all services and eventually low satisfaction of users.

SUMMARY OF THE INVENTION

Embodiments of the present invention provide a method and network apparatus for carrying multiple services.

The method for carrying multiple services includes:
transmitting services to bearer channels at a physical port of an XDSL chipset respectively according to different requirements of the services on service latency; and
mapping the services on bearer channels into latency paths respectively according to preset relations between the bearer channels and the latency paths.

A network apparatus for carrying multiple services includes:
a transmission protocol layer entity, for storing transmission latency parameters corresponding to bearer channels at a physical port of an XDSL chipset, and transmitting services to the bearer channels at the physical port of the XDSL chipset respectively according to different requirements of the services on service latency and the transmission latency parameters; and
an XDSL chipset, for storing a mapping relation between the bearer channels and the latency paths, and mapping the services on the bearer channels into the latency paths respectively according to the mapping relations; wherein
the mapping relations are set according to the transmission latency parameters of the bearer channels.

A transmission protocol layer entity for carrying multiple services includes:
a storage module, for storing transmission latency parameters corresponding to bearer channels at a physical port of an XDSL chipset;
a transmission module, for transmitting services to the bearer channels at the physical port of the XDSL chipset respectively according to the transmission latency parameters stored in the storage module and the requirements of the services on service latency.

An XDSL chipset for carrying multiple services includes:
a first module, for storing a mapping relations between bearer channels and latency paths; and
a second module, for mapping services on the bearer channels into the latency paths respectively according to the mapping relations; wherein
the mapping relations are set according to the transmission latency parameters of the bearer channels.

It can be seen from the technical scheme above that, the transmission protocol layer entity transmits different services to different bearer channels according to different requirements of services on transmission latency in the embodiments of the present invention, so that different services can be transmitted on different latency paths and the requirements of different services on transmission latency and transmission quality can all be satisfied. The method provided by an embodiment of the present invention for carrying multiple services features flexible application to varieties of transmission technologies including ATM, STM, PTM, etc., the method is also applicable to ADSL or VDSL technology and makes up for the disadvantage of ADSL or VDSL technology that the XDSL chipset does not support multiple latency paths. The technical scheme provided by an embodiment of the present invention improves the application of XDSL and further the satisfaction of users.

DETAILED DESCRIPTION OF THE INVENTION

Figure 1:
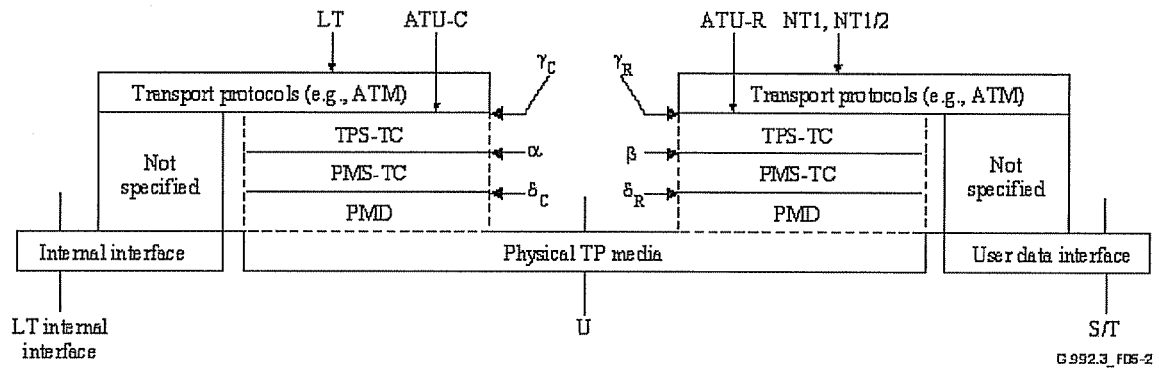
FIG. 1 is a schematic diagram illustrating a reference model of ADSL user plane protocol.
Figure 2:
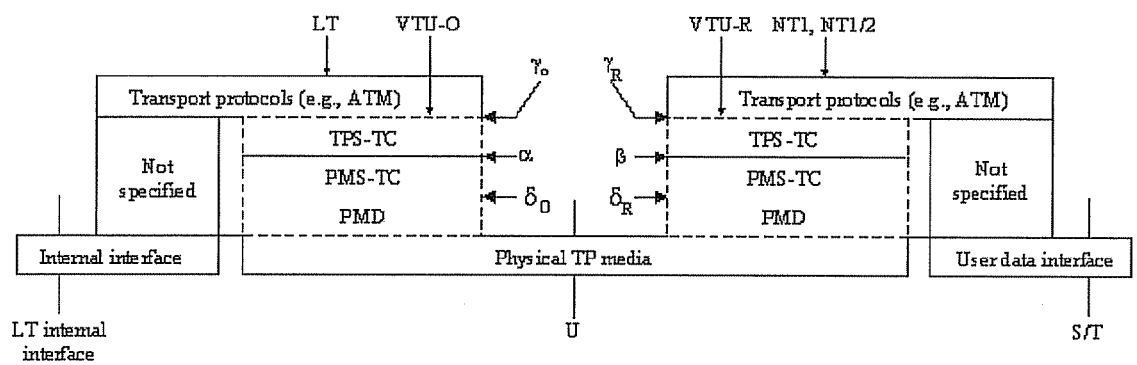
FIG. 2 is a schematic diagram illustrating a reference model of VDSL user plane protocol.

FIG. 1 is a schematic illustrating a reference model of ADSL user plane protocol and FIG. 2 is a schematic illustrating a reference model of VDSL user plane protocol.

It can be seen from FIGS. 1 and 2 that the reference model of user plan protocol of either ADSL or VDSL includes three layers, namely, Transmission Protocol Specific TC Layer (TPS-TC), Physical Media-Specific TC Layer (PMS-TC) and Physical Media Dependent (PMD) sub-layer.

The transmission protocol layers in FIGS. 1 and 2 are not included in the XDSL technology and the functionality of the transmission protocol layers are performed by chips other than XDSL chipsets. The transmission protocol layer of either ADSL or VDSL may function in Synchronous Transfer Mode (STM), Asynchronous Transfer Mode (ATM) or Packet Transfer Mode (PTM). Conventionally, the ADSL transmission layer mainly adopts ATM and the VDSL transmission layer mainly adopts PTM; in order to be compatible with ADSL, VDSL also supports ATM.

Because of the different protocols supported on the transmission layer, a Transmission Protocol Specific TC (TPS-TC) layer is set up on the Transmission Convergence (TC) layer, and is used for converting the data on the transmission layer into the data of the PMS-TC layer. The data transmission entities on the TPS-TC layer are usually called frame bearers or bearer channels, and are referred to as bearer channel herein. Conventionally, ADSL supports 4 bearer channels at most and VDSL supports 2 bearer channels at most.

The main functions of PMS-TC layer include: framing, frame synchronizing, Forward Error Correction (FEC), error verification, scrambling and interleaving. The data transmission entities on the PMS-TC layer are usually referred to as latency paths, and are so called herein. A latency path is able to transmit data from different bearer channels on the TPS-TC layer while the data from a bearer channel on the TPS-TC layer cannot be divided into different latency paths for transmission, i.e., N bearer channels correspond to 1 latency path and N>=1.

Figure 3:
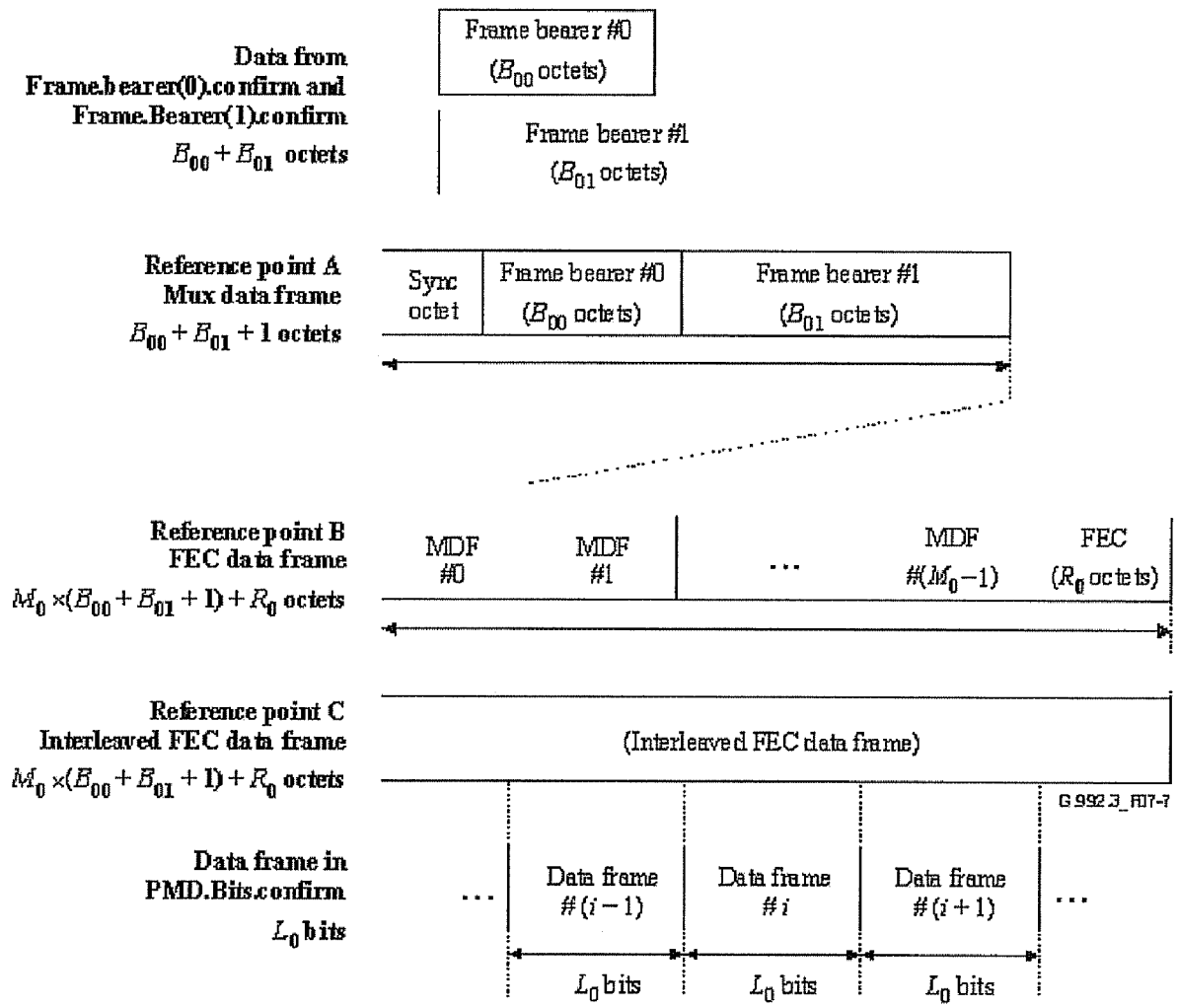
FIG. 3 is a schematic diagram illustrating the framing flow of the data from two bearer channels transmitted in a latency path in accordance with an embodiment of the present invention.

FIG. 3 is a schematic illustrating the framing flow of the data from two bearer channels transmitted in a latency path in accordance with an embodiment of the present invention.

FIG. 3 shows the framing of an ADSL frame for a single latency path and two bearer channels. It can be seen in FIG. 3 that the data from multiple bearer channels can be transmitted to the line side via one latency path.

Conventionally, ADSL supports 4 latency paths at most and VDSL supports 2 latency paths at most. The difference between latency paths lies in interleavers of the latency paths. After interleaving, the long paroxysmal bit errors on the line are distributed to multiple FEC units, i.e., multiple Reed-Solomon codeword, which facilitates the FEC of the bit errors. However, interleavers introduce latency into data transmission while improving the error correction capability of the system. The deeper interleaving do the interleavers perform, the greater improvement is provided for the error correction capability of the system, and the longer latency is introduced into data transmission. Long transmission latency causes problems including: unnecessary resending of massive data in a service transmitted by the upper layer with a reliable transmission protocol such as TCP; severe impact on the service quality of a service sensitive to latency, such as VoIP, which may result in unacceptable service quality. Therefore, XDSL has to support multiple latency paths in order to support different services with different requirements on transmission latency and pulse protection on one XDSL line.

Although multiple latency paths demonstrate the advantages explained in the fore-going description, and in the earliest ADSL standard, i.e. the G.992.1 of 1999, the concept of Dual Latency was defined, i.e. user data was simultaneous transported to both the fast and interleaved paths in any one direction; however, multiple latency has not been supported till now.

Figure 4:
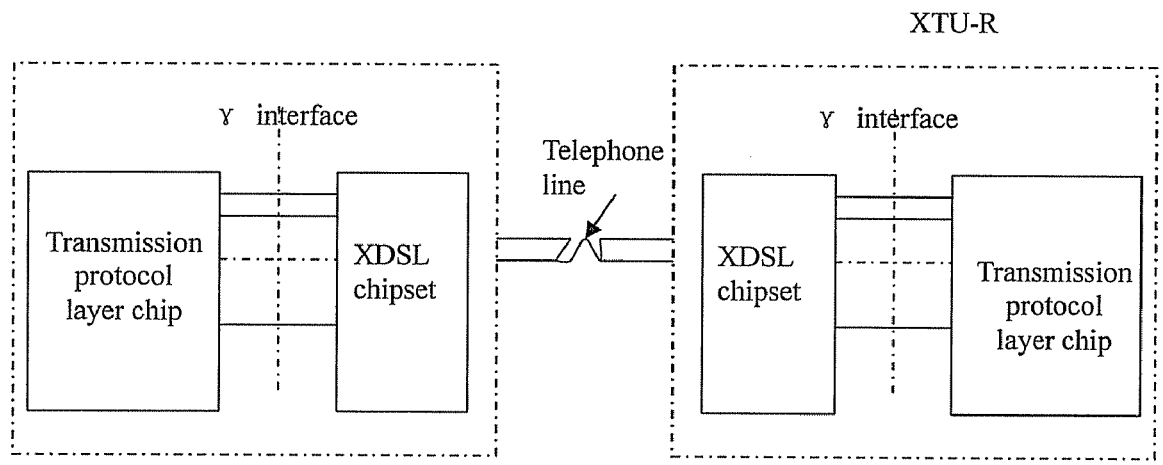
FIG. 4 is a block diagram illustrating the XTU hardware logic in an embodiment of the present invention.

Most of conventional XDSL chipsets support one bearer channel and one latency path each. FIG. 4 shows a block diagram of the hardware logic of an XDSL Transceiver Unit (XTU) in the case that the XDSL chipset supports only one bearer channel and one latency path.

As shown in FIG. 4, the interfaces between chips on the transmission protocol layer and the XDSL chipsets are Interfaces γ, while the transmission protocol layer may adopt STM, ATM or PTM. An XDSL chipset may be installed on an ATU at The Central Office End (ATU-C), a VTU at the ONU (VTU-O), ATU at The Remote Terminal End (ATU-R) or a VTU at The Remote Site (VTU-R).

The XDSL chipset on the ATU-C/VTU-O side usually is equipped with multiple ADSL/XDSL physical ports, and the chips on the transmission protocol layer may correspond to different ADSL/XDSL physical ports via different physical layer (PHY) addresses. The XDSL chipset on the XTU-R side usually has only one port. The "/" means "or" in embodiments of the present invention.

The method for carrying multiple services while the XDSL port supports single latency path includes the following steps.

First of all, an activation template of the port is set up, including a channel template, and the item that relates to a latency path in the activation template is the maximum channel latency.

Then a dual layer service channel is set up and the services shall be divided according to flow classification or simple binding mode. The step can be performed in the following two ways.

The first way is designed for ATM transmission, in which at least one VC connection is established at the ADSL port. Multiple VC connections, each carrying a different service, or a single VC connection for all services may be established.

When multiple VC connections are established, the XTU-R side may adopt flow classification or bind the ports on the user side with Permanent Virtual Channels (PVC) to allocate user side packets with different service characteristics to different VCs. The ATU-C/VTU-O performs different processes with packets received on different VCs.

When different services are transmitted on a same VC, the XTU-R side encapsulates the user side packets into ATM cells and the XTU-R side may further add some parameters into the user side packets indicating the service characteristics, e.g., Ethernet type, user side Virtual Local Area Network (VLAN), 802.1p priority level, etc. The ATU-C/VTU-O needs to perform a flow classification and perform different processes with different services according to the characteristics of the services.

The second way is designed for PTM and STM transmission, and is similar to the single PVC mode for ATM transmission. In the second way the XTU-R side transmits the user side packets directly on the XDSL, and XTU-R side may further add some parameters into the user side packets indicating the service characteristics, e.g., Ethernet type, user side VLAN, 802.1p priority level, etc. The ATU-C/VTU-O needs to perform a flow classification and perform different processes with different services according to the characteristics of the services.

It can be concluded from the relationship between the amount of latency paths and the amount of bearer channel that when the physical port of XDSL supports multiple latency paths, the physical port of XDSL supports multiple bearer channel, too. Since one XDSL physical port conventional supports one latency path only, the transmission protocol layer apparently recognizes the XDSL physical port instead of a bearer channel. When the XDSL supports multiple bearer channels and every bearer channel at a XDSL physical port can be accessed with a PHY address or control signal, the XDSL physical port that supports multiple bearer channels can be regarded as multiple XDSL physical ports, each of which supports a single bearer channel. Therefore the XDSL physical port will be able to support multiple latency paths.

Therefore, according to the technical scheme provided in the embodiment of the present invention, corresponding relations between the transmission protocol layer entity and multiple bearer channels at the physical port of the XDSL chipset shall be set up first, and the mapping relations between the bearer channels and multiple latency paths shall then be set up according to the transmission latency parameters of the bearer channels. After the step of setting, the transmission protocol layer entity will be able to transmit different services to different bearer channels according to the requirements of the services on transmission latency while transmitting services to the XDSL chipset. Therefore the XDSL chipset will be able to map the services on different bear channel into different latency paths according to the defined mapping relations to achieve multiple services transmission.

The transmission protocol layer entity in the embodiment of the present invention may include an ATM layer chip, or STM layer chip, or PTM layer chip. The XDSL chipset and the transmission protocol layer entity in the embodiment of the present invention may be installed on ATU-C, or ATU-R, OR VTU-O, or VTU-R.

The setting up of the corresponding relations between the transmission protocol layer entity and the physical port of the XDSL chipset in the embodiment of the present invention can be performed in the following two ways.

In the first way, the transmission protocol layer entity accesses different bearer channels at the physical port of the XDSL chipset through different PHY addresses, i.e., the information of multiple addresses of the γ interfaces between the transmission protocol layer entity and the XDSL chipset is set in the transmission protocol layer entity. Therefore the transmission protocol layer entity may perform information interaction with multiple bearer channel at the physical port of the XDSL chipset through different address information. When the transmission protocol layer entity includes the ATM layer process chip and the XDSL chipset includes an ADSL chipset, the interface between the ATM layer process chips and the ADSL chipset will be UTOPIA interface.

In the second way, the transmission protocol layer entity accesses different bearer channels at the physical port of the XDSL chipset through different control signals, i.e., the transmission protocol layer entity is able to exchange information with different bearer channels at the physical port of the XDSL chipset through different control signals. The control signals include address line control signals.

In the embodiment of the present invention, different bearer channels have different transmission latency parameters respectively and correspond to different latency paths. Obviously, two bearer channels may have identical transmission latency parameters and thus correspond to a same latency path. That is, the mapping relations between the bearer channels and the latency paths shall be N:M, wherein both N and M are greater than 1 and N is greater than or equal to M.

While transmitting services to the XDSL chipset, since the transmission protocol layer entity corresponds to multiple bearer channels, the transmission protocol layer entity is able to transmit different services to different bearer channels according to the latency requirements of the services and the predetermined transmission latency parameters of the bearer channels.

Having received services on the bearer channels, the XDSL chipset maps the services on different bearer channels into different latency paths according to the mapping relations between the bearer channels and the latency paths. Different services are thus transmitted to different latency paths, e.g., the XDSL chipset transmits voice services to a latency path with short transmission latency so that the requirement of the voice service on short latency is met, and transmits video services to a latency path with long transmission latency so that the requirement of the video service on low packet loss rate is met.

In the standards, the number of latency paths and the number of bearer channels are conventionally the same, thus the XDSL chipset may bind one bearer channel with one latency path, and the mapping relations between latency paths and bearer channels are simply the binding relations, i.e., one bearer channel corresponds to one latency path and multiple bearer channel would never be multiplexed into one latency path.

The transmission protocol layer entity in the embodiment of the present invention may configure Layer 2 service channels, i.e., configure the Layer 2 service channels to the bearer channels to transmit services to the bearer channel of the XDSL chipset via the Layer 2 service channels. A Layer 2 service channel is a logic channel carrying service data on the data link layer; the Layer 2 service channel may include a user port, or a PVC connection, or a even smaller logic service bearer channel obtained by using flow classification technique based on a user port or PVC connection.

When the XDSL chipset has bound the bearer channels and latency paths one by one, the transmission protocol layer entity may assign different Layer 2 service channels to different latency paths, which, in fact, equals assigning different service channels to different latency paths.

The technical scheme of an embodiment of the present invention is further explained herein with reference to accompanying drawings in which the transmission protocol entity is an ATM layer process chip and the y interface is a UTOPIA interface.

Figure 5:
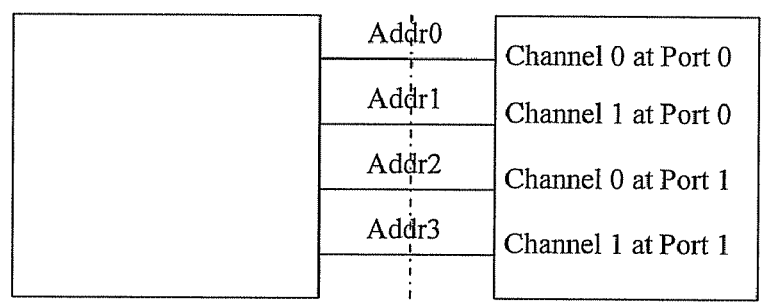
FIG. 5 is a schematic diagram illustrating the method for carrying multiple services based on XDSL in an embodiment of the present invention.

FIG. 5 shows the connection between the ATM layer chip and the XDSL chipset when the XDSL chipset adopts two bearer channels and two latency paths.

As shown in FIG. 5, the XDSL chipset has two physical ports, each of which provides two bearer channels, i.e., Channel 0 and Channel 1 in FIG. 5. Every physical port provides two latency paths. The XDSL chipset and the ATM chip are connected via an UTOPIA interface.

The method for carrying multiple services includes the following steps.

Step 501: regarding every bearer channel as a physical port of a single latency path, accessing every bearer channel with a unique PHY address or control signal, e.g., address line control signal, on the hardware layer.

Step 502: setting transmission latency parameter, e.g., maximum latency, for each bearer channel respectively, and associating bearer channels and latency paths automatically by the XDSL chipset according to the maximum latency values of the bearer channels, i.e., determining a corresponding latency path for each bearer channel.

Step 503: configuring Layer 2 service channels by the ATM layer chip, e.g., configuring VC connections, and transmitting services to bearer channels via Layer 2 service channels by the ATM layer chip according to the latency requirements of the services, so that the XDSL chipset may transmit services on different bearer channels to different latency paths according to the mapping relations between the bearer channels and the latency paths.

In Step 503, the ATM layer chip may also adopt flow classification based on VC connections to classify the service flows into smaller service flows which are then transmitted to different bearer channels via VC connections. The XDSL chipset may also simply bind the bearer channels with latency paths so that the Layer 2 service channels configured by the ATM layer chip can be assigned to specific latency paths.

The transmission of service packets on the Layer 2 service channels when the XDSL chipset adopts ATM, or PTM, or S™ is explained hereafter.

When the XDSL chipset adopts ATM:

VC connections to different bearer channels at the XDSL physical port are established on the ATM layer chip, and the user data flow on each VC connection may be further classified with flow classification technique, then the ATM layer chip on the XTU-R side allocates user side packets with different service characteristics to different VC for further transmission, the ATU-C/VTU-O side will thus process the user side packets from different latency paths in different ways.

The XTU-R side may also bind the bearer channels with latency paths by using simple binding technique and the ATM layer chip will then assign VC connections to latency paths, i.e., to bearer channels in fact.

When the XDSL chipset adopts PTM or S™, the process will be similar to the process when the XDSL chipset adopts ATM.

The PTM/STM layer chip on the XTU-R side may add parameters into the user side packets indicating the service characteristics, e.g., Ethernet type, user side Virtual Local Area Network (VLAN), 802.1p priority level, etc., i.e., classify the user data flows into different service flows with flow classification technique, then the PTM/STM layer chip on the XTU-R side transmits the service flows to different bearer channels so that the XDSL chipset may transmit the service flows on different bearer channels to different latency paths.

Practically, the PTM/STM layer chip on the XTU-R side may add no parameter of service characteristics into the user packets, but directly transmits the user side packets to different bearer channels for the XDSL chipset to further transmit the user side packets on different latency paths.

The PTM/STM layer chip on the ATU-C/VTU-O side classifies the service packets to be transmitted and transmits the service packets to different bearer channels according to different service characteristics of the packets, so that the XDSL chipset may transmit the services on different bearer channels to different latency paths.

The network apparatus provided by an embodiment of the present invention for carrying multiple services includes a transmission protocol layer entity and an XDSL chipset. The transmission protocol layer entity is connected to multiple bearer channels at a physical port of an XDSL chipset, and the transmission protocol layer entity further includes a storage module and a transmission module.

The transmission protocol layer entity is able to transmit services to different bearer channels. The transmission protocol layer entity may access different bearer channels at the physical port of the XDSL chipset with different PHY addresses or different control signals, i.e., the XDSL chipset provides corresponding interfaces so that the transmission protocol layer entity may access different bearer channels at the physical port of the XDSL chipset with different PHY addresses or controls different bearer channels with different control signals.

The transmission protocol layer entity is used for transmitting different services with the transmission module to different bearer channels on the XDSL chipset and the transmission protocol layer entity may be an ATM layer chip, or an STM layer chip, or a PTM layer chip. The transmission process is given in the fore-going description.

The XDSL chipset is used for storing the corresponding relations between bearer channels and latency paths and the relations are set according to the transmission latency parameters of the bearer channels, and transmitting the services on different bearer channels to different latency paths according to the corresponding relations to achieve the transmission of multiple services.

The XDSL chipset may also bind a bearer channel with a latency path. The transmission protocol layer entity may also configure the Layer 2 service channel connections to the bearer channels, e.g., VC connections to the bearer channels, so that the transmission module may transmit services to corresponding bearer channels via the Layer 2 service channels. The transmission protocol layer entity may classify the services into smaller service flows with flow classification technique and transmit the service flows to corresponding bearer channels. The transmission process is given in the fore-going description.

The foregoing is only preferred embodiments of the present invention. The protection scope of this invention, however, is not limited to the above description. Any change or substitution, within the technical scope disclosed by this invention, easily occurring to those skilled in the art should be covered by the protection scope of this invention.

The invention claimed is:

1. A method for carrying multiple services, comprising:
   setting relations between bearer channels and latency paths according to transmission latency parameters of the bearer channels at a physical port of an XDSL chipset;
   transmitting services to the bearer channels at the physical port of the XDSL
   chipset respectively according to different requirements of the services on service latency; and mapping the services on bearer channels into latency paths respectively according to the relations between the bearer channels and the latency paths.

2. The method according to claim 1, wherein the bearer channels at the physical port of the XDSL chipset are accessed with different physical layer addresses.

3. The method according to claim 1, wherein the bearer channels at the physical port of the XDSL chipset are accessed with different control signals.

4. The method according to claim 2, further comprising:
setting up a Layer 2 service channel to the bearer channels.

5. The method according to claim 4, wherein the transmitting the services to the bearer channels respectively according to different requirements of the services on service latency comprises:
transmitting the services to the bearer channels respectively via the Layer 2 service channel according to different requirements of the services on service latency.

6. The method according to claim 4, wherein the Layer 2 service channel comprises at least one virtual container (VC) connection;
the transmitting the services to the bearer channels respectively according to different requirements of the services on service latency comprises:
transmitting the services to the bearer channels respectively by a transmission protocol layer entity via the at least one VC connection according to different requirements of the services on service latency when the transmission protocol layer entity comprises an ATM layer chip.

7. The method according to claim 4, wherein the Layer 2 service channel is a logic service bearer channel obtained using a flow classification technique based on VC connections;
the transmitting the services to the bearer channel respectively according to different requirements of the services on service latency comprises:
classifying the services into service flows by a transmission protocol layer entity based on the VC connections using a flow classification technique; and
transmitting the service flows to the bearer channels respectively according to different requirements of the services on service latency when the transmission protocol layer entity comprises an ATM layer chip.

8. The method according to claim 4, wherein the Layer 2 service channel is a logic service bearer channel obtained using a flow classification technique;
the transmitting the services to the bearer channel respectively according to different requirements of the services on service latency comprises:
classifying the services into service flows by a transmission protocol layer entity using the flow classification technique; and
transmitting the service flows to the bearer channels respectively according to different requirements of the services on service latency when the transmission protocol layer entity comprises an STM layer chip or a PTM layer chip.

9. The method according to claim 3, further comprising:
setting up a Layer 2 service channel to the bearer channels.

10. The method according to claim 9, wherein the transmitting the services to the bearer channels respectively according to different requirements of the services on service latency comprises:
transmitting the services to the bearer channels respectively via the Layer 2 service channel according to different requirements of the services on service latency.

11. The method according to claim 9, wherein the Layer 2 service channel comprises at least one virtual container (VC) connection;
the transmitting the services to the bearer channels respectively according to different requirements of the services on service latency comprises:
transmitting the services to the bearer channels respectively by a transmission protocol layer entity via the at least one VC connection according to different requirements of the services on service latency when the transmission protocol layer entity comprises an ATM layer chip.

12. The method according to claim 9, wherein the Layer 2 service channel is a logic service bearer channel obtained using a flow classification technique based on VC connections;
the transmitting the services to the bearer channel respectively according to different requirements of the services on service latency comprises:
classifying the services into service flows by a transmission protocol layer entity based on the VC connections using a flow classification technique; and
transmitting the service flows to the bearer channels respectively according to different requirements of the services on service latency when the transmission protocol layer entity comprises an ATM layer chip.

13. The method according to claim 9, wherein the Layer 2 service channel is a logic service bearer channel obtained using flow classification technique;
the transmitting the services to the bearer channel respectively according to different requirements of the services on service latency comprises:
classifying the services into service flows by a transmission protocol layer entity using a flow classification technique; and
transmitting the service flows to the bearer channels respectively according to different requirements of the services on service latency when the transmission protocol layer entity comprises an STM layer chip or a PTM layer chip.

14. The method according to claim 1, wherein the relations between the bearer channels and the latency paths comprise mapping relations or binding relations.

15. A network apparatus for carrying multiple services, comprising:
a transmission protocol layer entity, for storing transmission latency parameters corresponding to bearer channels at a physical port of an XDSL chipset, and transmitting services to the bearer channels at the physical port of the XDSL chipset respectively according to different requirements of the services on service latency and the transmission latency parameters;
wherein the XDSL chipset is used for storing mapping relations between the bearer channels and the latency paths, and mapping the services on the bearer channels into the latency paths respectively according to the mapping relations; wherein the mapping relations are set according to the transmission latency parameters of the bearer channels.

16. The network apparatus according to claim 15, further comprising one of an ADSL Transceiver Unit at the Central Office End (ATU-C), an ADSL Transceiver Unit at the Remote Terminal End (ATU-R), a VDSL2 Transceiver Unit at the Central Office End (VTU-O), and a VDSL2 Transceiver Unit at the Remote Site (VTU-R).

17. The network apparatus according to claim 15, wherein the transmission protocol layer entity comprises one of an Asynchronous Transfer Mode (ATM) layer chip, a Synchronous Transfer Mode (STM) layer chip, and a Packet Transfer Mode (PTM) layer chip.

18. A transmission protocol layer entity for carrying multiple services, comprising:
- a storage module, for storing transmission latency parameters corresponding to bearer channels at a physical port of an XDSL chipset;
- a transmission module, for transmitting services to the bearer channels at the physical port of the XDSL chipset respectively according to the transmission latency parameters stored in the storage module and the requirements of the services on service latency.

19. An XDSL chipset for carrying multiple services, comprising:
- a first module, for storing mapping relations between bearer channels and latency paths; and
- a second module, for mapping services on the bearer channels into the latency paths respectively according to the mapping relations;
- wherein the mapping relations are set according to the transmission latency parameters of the bearer channels.

* * * * *